UNITED STATES PATENT OFFICE.

BRANDT V. B. DIXON AND JOSEPH P. CARD, OF ST. LOUIS, MISSOURI.

PRESERVING WOOD.

SPECIFICATION forming part of Letters Patent No. 239,033, dated March 22, 1881.

Application filed August 21, 1880. (No specimens.)

*To all whom it may concern:*

Be it known that we, BRANDT V. B. DIXON and JOSEPH P. CARD, residents of St. Louis, Missouri, have made a new and useful Improvement in Preserving Wood, of which the following is a full, clear, and exact description.

The improvement has relation to the material used in treating the wood to be preserved, and to the mode of applying it thereto. The material employed is chloride of lead, and is applied as follows: Chloride of lead being insoluble in cold water, but soluble in hot water, a hot solution thereof is prepared, heated, say, to the boiling-point of water, and taking, preferably, about two (2) parts, by weight, of chloride of lead to ninety-eight (98) parts of water. This solution, while thus heated, is then applied to, injected, or incorporated in the wood, using in such operation any of the appliances commonly used in applying wood-preservatives, and employing pressure when it is desired to expedite the operation, or when it is necessary to condense any steam that may be in the pores of the wood. For, to enable the chloride to be properly applied, it is desirable to first heat and steam the wood. The pores of the wood are therefore filled with steam, and to enable the preservative fluid to enter them the steam must be condensed, which is effected by employing a pressure greater than the steam-pressure in the wood.

As a preservative chloride of lead is as valuable as any agent now used, and it is especially desirable from its insolubility in water at ordinary temperatures. When once lodged in the wood to be preserved it cannot be dissolved therefrom without an application of heat much above any atmospheric temperature.

We are aware that heated solutions, in preserving wood, have heretofore been used, and therefore do not claim such, broadly. We are also aware that chloride of lead has heretofore been used, in conjunction with other agents, in treating wood for preservation, and hence its use in such connection we do not claim; but

We claim—

1. The process of preserving wood which consists in subjecting said wood to a simple solution of chloride of lead in a heated state, substantially as described.

2. As a new article, preserved wood impregnated with chloride of lead, substantially as described.

BRANDT V. B. DIXON.
JOS. P. CARD.

Witnesses:
CHAS. D. MOODY,
WM. R. HARDCASTLE.